US011282285B1

(12) United States Patent
Trim et al.

(10) Patent No.: US 11,282,285 B1
(45) Date of Patent: Mar. 22, 2022

(54) REAL-WORLD OBJECT LOCATION IDENTIFICATION USING 5G NETWORK TECHNOLOGY

(71) Applicant: International Business Machines Corporation, Armonk, NY (US)

(72) Inventors: Craig M. Trim, Ventura, CA (US); Kimberly Greene Starks, Nashville, TN (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/144,541

(22) Filed: Jan. 8, 2021

(51) Int. Cl.
  *G06T 19/00* (2011.01)
  *G06F 3/01* (2006.01)
  *G06V 20/20* (2022.01)

(52) U.S. Cl.
  CPC ............ *G06T 19/006* (2013.01); *G06F 3/011* (2013.01); *G06V 20/20* (2022.01)

(58) Field of Classification Search
  None
  See application file for complete search history.

(56) References Cited

U.S. PATENT DOCUMENTS

| 9,942,768 | B1 | 4/2018 | Frank et al. |
| 10,397,297 | B2 | 8/2019 | Park et al. |
| 10,572,738 | B2 | 2/2020 | Leizerovich et al. |
| 10,607,083 | B2 | 3/2020 | Pekelny et al. |
| 10,650,235 | B2 | 5/2020 | Zhou et al. |
| 10,661,149 | B2 | 5/2020 | Kudirka et al. |
| 2015/0235240 | A1 | 8/2015 | Chang et al. |
| 2017/0332192 | A1* | 11/2017 | Edge ..................... H04W 4/029 |
| 2019/0116229 | A1 | 4/2019 | Shi et al. |
| 2019/0246238 | A1* | 8/2019 | Crutchfield ............ G06Q 50/01 |
| 2019/0378280 | A1 | 12/2019 | Cho et al. |
| 2019/0394428 | A1 | 12/2019 | Nam |
| 2020/0098189 | A1* | 3/2020 | Pavloff ................. G06F 3/0346 |

(Continued)

OTHER PUBLICATIONS

Ye, Haibo et al., "HiMeter: Telling You the Height Rather than the Altitude", Sensors, MDPI, May 25, 2018, 20 pgs.

(Continued)

*Primary Examiner* — Nicholas R Wilson
(74) *Attorney, Agent, or Firm* — Brian M. Restauro; Hunter E. Webb; Keohane & D'Alessandro, PLLC

(57) ABSTRACT

Embodiments described herein provide approaches for enabling visual location of a real-world object. Specifically, an object location service is initiated in a service orchestration layer of a 5G telecom network in response to a request from a user corresponding to the real-world object. This object location service collects a stream of three-dimensional location coordinates from both the user's device and the real-world object's device. Based on these sets of sets of location coordinates, the object location service calculates a continuously updated three-dimensional vector from the user to the real-world object. The object location service uses this continuously updated three-dimensional vector to apply an augmented reality indicator that is continuously updated in real-time to the real-world object on a display of the UE device corresponding to the user.

17 Claims, 8 Drawing Sheets

(56) References Cited

U.S. PATENT DOCUMENTS

| | | |
|---|---|---|
| 2020/0162849 A1 | 5/2020 | Edge et al. |
| 2020/0193976 A1* | 6/2020 | Cartwright .............. G06F 3/011 |
| 2020/0228940 A1 | 7/2020 | Huang et al. |
| 2020/0236511 A1 | 7/2020 | Perdew et al. |

OTHER PUBLICATIONS

Roy, Siuli et al., "Neighborhood Tracking and Location Estimation of Nodes in Ad hoc Networks Using Directional Antenna: A Testbed Implementation", Jun. 2005, 6 pgs.

Imran, Shujaa, How to Measure Altitude Using Your Phone, Nov. 4, 2020, 14 pgs.

Baraniuk, Chris, "Phone sensors can save lives by revealing what floor you are on", NewScientist, Nov. 3, 2017, 8 pgs.

"Optimizing Network Applications for 5G", www.ericsson.com/en/news/2017/4/optimizing-network-applications-for-5g, Apr. 21, 2017, 1 pg.

Ferro et al., "5G-Enabled Security Scenarios for Unmanned Aircraft: Experimentation in Urban Environment", DRONES, vol. 4, Issue 2, Jun. 12, 2020, 13 pages.

Jiang et al., "Data Fusion-Based Multi-Object Tracking for Unconstrained Visual Sensor Networks", IEEE, vol. 6, Mar. 6, 2018, pp. 13716-13728.

Song et al., "Online Multi-Object Tracking and Segmentation with GMPHD Filter and Simple Affinity Fusion", Gwangju Institute of Science and Technology, Aug. 1, 2020, 4 pages.

Liu et al., "Multiple Object Tracking for Dense Pedestrians by Markov Random Field Model with Improvement on Potentials", SENSORS, vol. 20, Issue 3, Jan. 22, 2020, 22 pages.

Bredereck et al., "Data Association for Multi-Object Tracking-by-Detection in Multi-Camera Networks", ICDSC IEEE 6th International Conference, Oct. 30-Nov. 2, 2012, 6 pages.

* cited by examiner

REAL-WORLD OBJECT LOCATION IDENTIFICATION USING 5G NETWORK TECHNOLOGY

TECHNICAL FIELD

The subject matter of this invention relates generally to real-world object location identification. More specifically, aspects of the present invention provide a solution that leverages the functionality provided by 5G network technology to enable a user visibly to identify the location of an object in the real-world.

BACKGROUND 5G network technology is a new radio (NR) telecommunications technology that offers a set of real time, ultra-high-speed data communication facilities that many see as moving telecommunications to a new higher stratum. One of the major advancements of 5G technology over 3G/4G is that 5G offers a network that is itself cognitive, using intelligent, self-adapting service orchestration and a network softwarization framework along with Software Defined Networking (SDN) of 5G Virtual Network Functions (VNFs). Further, the 5G technology enables high speed data transfer (1 GBps) over 5G Signaling Radio Bearers (SRBs). 5G NR SRBs are defined as Radio Bearers (RBs) that are used only for the transmission of Radio Resource Control (RRC) and Non-Access Stratum (NAS) messages.

Medium Access Control (MAC) Layer of NR provides services to the Radio Link Control (RLC) Layer by providing controls in the form of logical channels. These logical channels form a virtualized communication network interface that is used to transfer 10 commands (network data packets) and control instructions over radio interface and 5G fixed access type networks. A logical channel can be defined by the type of information it carries and is generally differentiated either as a control channel, used for transmission of control and configuration information or as a traffic channel used for the user data. 5G new radio technology allows for the creation of multiple logical channels over a single radio bearer network using the 5G network slicing models. These channels can be used to carry specialized traffic from a User Equipment (UE) device to the 5G network. Because multiple channels are created from a single device to the 5G network, the channels deliver parallelism in the packet transmission as well as reducing the exclusive locking of the 5G network resources.

These new and improved features allow 5G networks and the UE devices that utilize them to incorporate new functionalities and to achieve increased performance in performing the functions that could previously have been performed in older (e.g., 3G, 4G, etc.) environments. For example, the functionality of location finding services, such as GPS and/or other location services, that are available to UE devices are becoming more intelligent with the enablement of 5G technology. The increased throughput provided by 5G technology increases the speed and precision of device location to the next stratum, permitting accurate device locations to be determined using enhanced positioning systems that are newly becoming available and others that are still being researched.

SUMMARY

In general, embodiments described herein provide approaches for enabling visual location of a real-world object. Specifically, an object location service is initiated in a service orchestration layer of a 5G telecom network in response to a request from a user corresponding to the real-world object. This object location service collects a stream of three-dimensional location coordinates from both the user's device and the real-world object's device. Based on these sets of location coordinates, the object location service calculates a continuously updated three-dimensional vector from the user to the real-world object. The object location service uses this continuously updated three-dimensional vector to apply an augmented reality indicator that is continuously updated in real-time to the real-world object on a display of the UE device corresponding to the user.

One aspect of the present invention includes a computer-implemented method, comprising: initiating, in response to a request from a user corresponding to the real-world object, an object location service in a service orchestration layer of a 5G telecom network; collecting, by the object location service, a stream of three-dimensional coordinates corresponding to each of a user equipment (UE) device of the user and a UE device corresponding to the real-world object; calculating, by the object location service, a continuously updated three-dimensional vector from the user to the real-world object based on the set of user coordinates and a set of object coordinates; and applying, by the object location service, an augmented reality indicator to the real-world object that is continuously updated in real-time on a display of the UE device corresponding to the user based on the continuously updated three-dimensional vector.

Another aspect of the present invention includes a computer system, comprising: a memory medium comprising program instructions; a bus coupled to the memory medium; and a processor for executing the program instructions, the instructions causing the system to: initiate, in response to a request from a user corresponding to the real-world object, an object location service in a service orchestration layer of a 5G telecom network; collect, by the object location service, a stream of three-dimensional coordinates corresponding to each of a user equipment (UE) device of the user and a UE device corresponding to the real-world object; calculate, by the object location service, a continuously updated three-dimensional vector from the user to the real-world object based on the set of user coordinates and a set of object coordinates; and apply, by the object location service, an augmented reality indicator to the real-world object that is continuously updated in real-time on a display of the UE device corresponding to the user based on the continuously updated three-dimensional vector.

Yet another aspect of the present invention includes a computer program product, comprising a computer readable storage device, and program instructions stored on the computer readable storage device, to: initiate, in response to a request from a user corresponding to the real-world object, an object location service in a service orchestration layer of a 5G telecom network; collect, by the object location service, a stream of three-dimensional coordinates corresponding to each of a user equipment (UE) device of the user and a UE device corresponding to the real-world object; calculate, by the object location service, a continuously updated three-dimensional vector from the user to the real-world object based on the set of user coordinates and a set of object coordinates; and apply, by the object location service, an augmented reality indicator to the real-world object that is continuously updated in real-time on a display of the UE device corresponding to the user based on the continuously updated three-dimensional vector.

Still yet, any of the components of the present invention could be deployed, managed, serviced, etc., by a service provider who offers to implement passive monitoring in a computer system.

Embodiments of the present invention also provide related systems, methods, and/or computer program products.

BRIEF DESCRIPTION OF THE DRAWINGS

These and other features of this invention will be more readily understood from the following detailed description of the various aspects of the invention taken in conjunction with the accompanying drawings in which.

Figure 1:
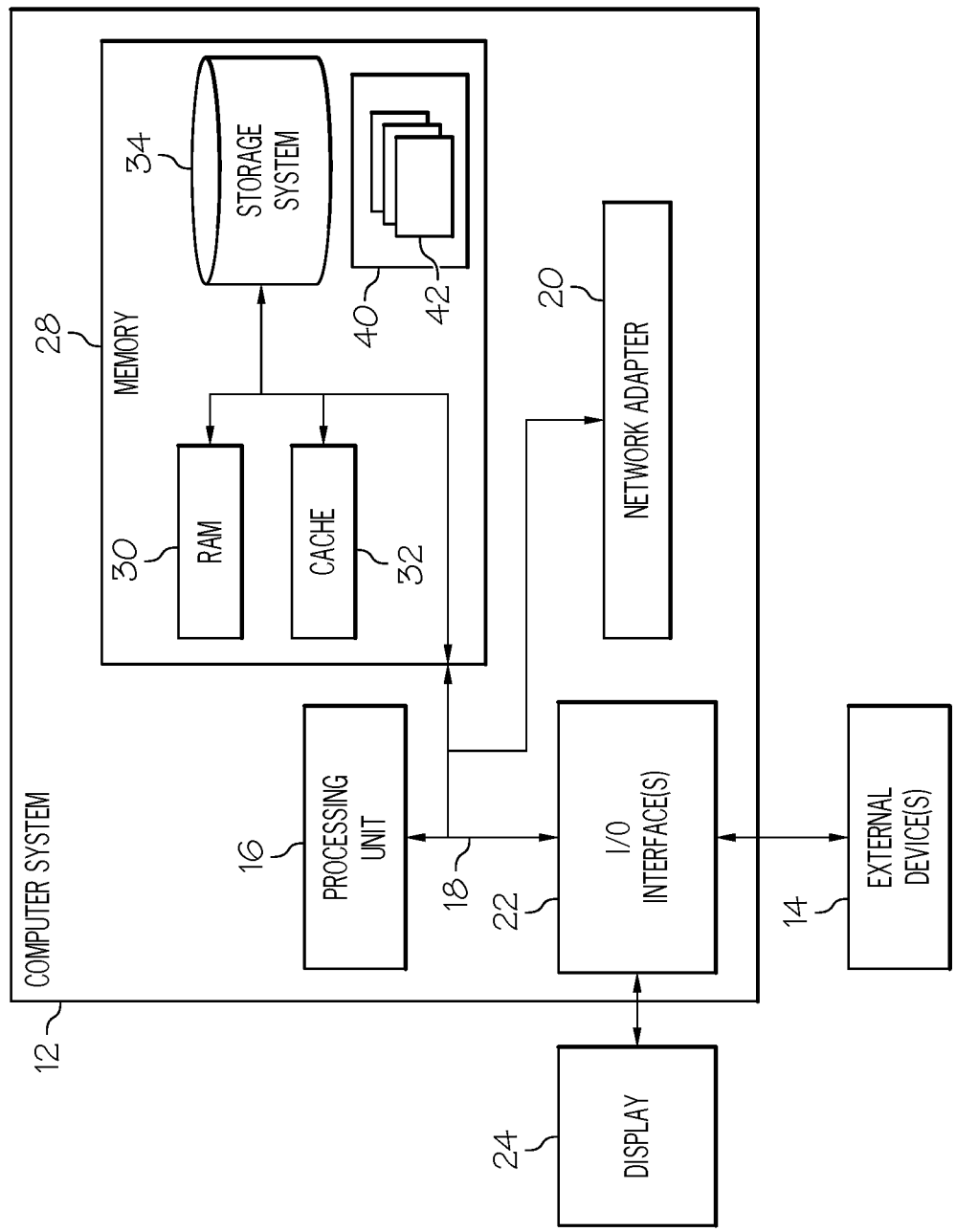
FIG. 1 shows a block diagram that illustrates a computer implementation in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide approaches for enabling visual location of a real-world object. Specifically, an object location service is initiated in a service orchestration layer of a 5G telecom network in response to a request from a user corresponding to the real-world object. This object location service collects a stream of three-dimensional location coordinates from both the user's device and the real-world object's device. Based on these sets of sets of location coordinates, the object location service calculates a continuously updated three-dimensional vector from the user to the real-world object. The object location service uses this continuously updated three-dimensional vector to apply an augmented reality indicator that is continuously updated in real-time to the real-world object on a display of the UE device corresponding to the user.

Referring now to FIG. 1, a computerized implementation 10 of an embodiment for enabling visual location of a real-world object is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network (e.g., 5G telecom network), and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for enabling visual location of a real-world object. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for enabling visual location of a real-world object, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 2:
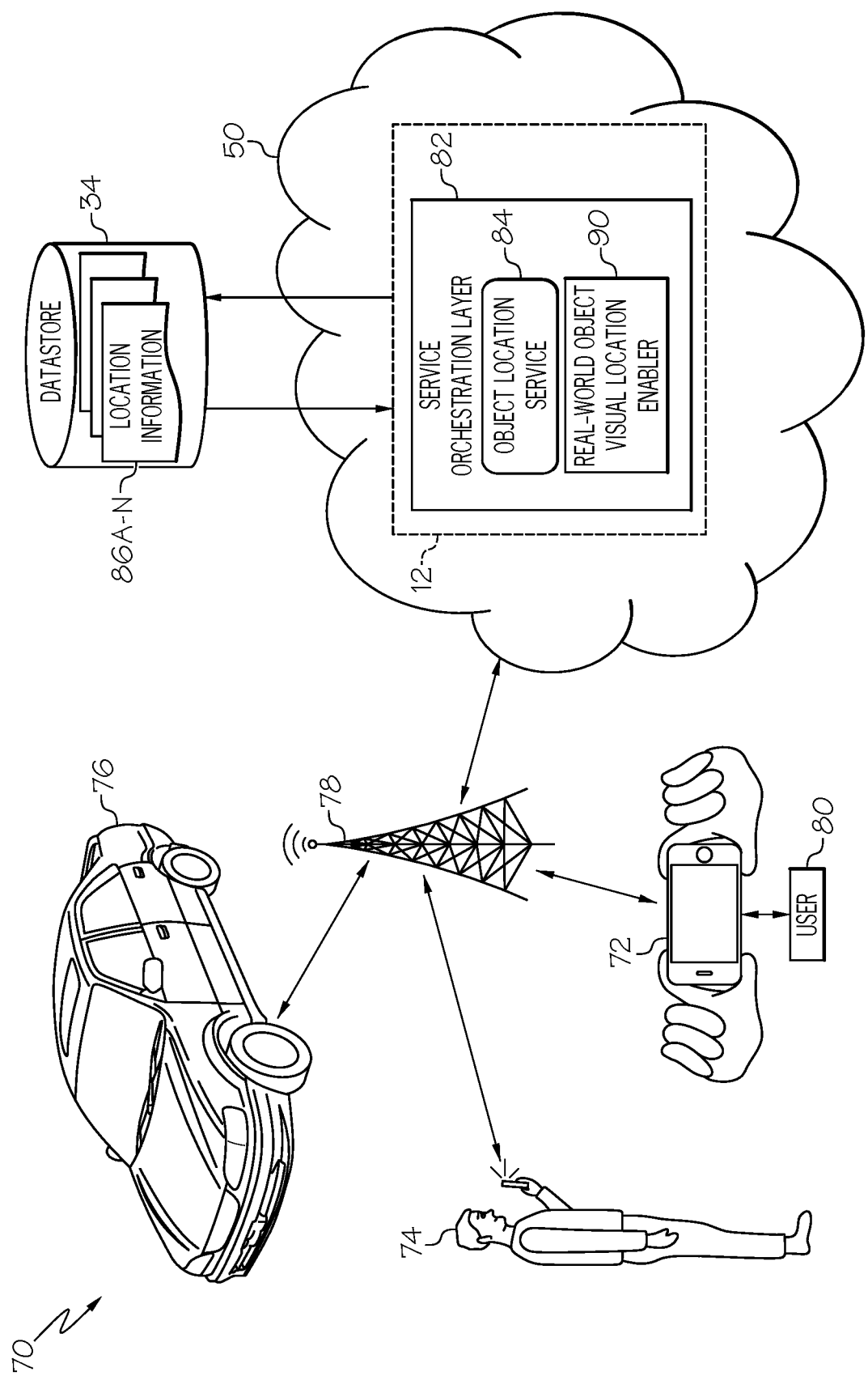
FIG. 2 shows an example system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a 5G telecom network environment 50). A stand-alone computer system/ server 12 is shown in FIG. 2 for illustrative purposes only. In the event the teachings recited herein are practiced in a networked computing environment 70, each client user equipment (UE) device 72, whether possessed by user 80, human real-world object 74, non-human real-world object 76, and/or the like need not have a real-world object location enabler (hereinafter "system 90"). Rather, system 90 could be loaded on a server or server-capable device that communicates (e.g., wirelessly) with the clients to provide real-world object location functionality therefor. Regardless, as depicted, system 90 is shown within computer system/server 12. In general, system 90 can be implemented as program/ utility 40 on computer system 12 of FIG. 1 and can enable the functions recited herein. It is further understood that system 90 may be incorporated within or work in conjunction with any type of system that receives, processes, and/or executes commands with respect to interaction of UE devices 72 in a networked computing environment (e.g., a 5G telecom network environment). Such other system(s) have not been shown in FIG. 2 for brevity purposes.

Figure 3:
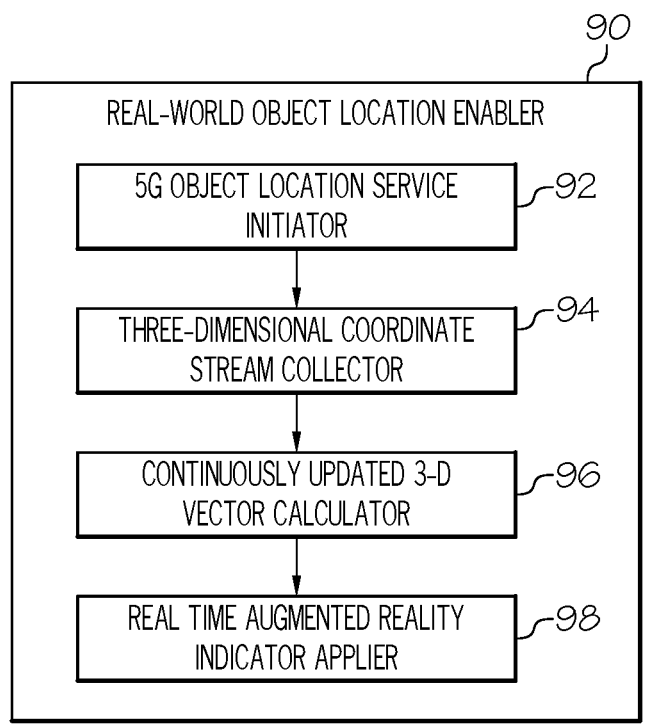
FIG. 3 shows a block diagram that illustrates a system according to illustrative embodiments.

Referring additionally to FIG. 3, system 90 may perform multiple functions. Specifically, among other functions, system 90 can function to visualize navigation information for a connected autonomous vehicle in networked computing environment 70 (e.g., 5G telecom network environment). To accomplish this, system 90 can include: a 5G object location service initiator 92, a three-dimensional coordinate stream collector 94, a continuously updated three-dimensional (3-D) vector calculator 96, and a real time augmented reality indicator applier 98.

Referring again to FIG. 2, networked computing environment 70 enables UE devices 72 (e.g., as possessed by user 80, human object 74, non-human object 76, and/or the like) to communicate with other UE devices 72 via 5G telecom network 50. In addition, 5G telecom network 50 can enable UE devices 72 to connect with other resources in networked computing environment including, but not limited to servers, local area networks, wide area networks, the Internet, etc. To accomplish this, networked computing environment can include one or more transmission nodes 78 within signal range of the UE device 72, allowing UE devices 72 to connect thereto. Transmission nodes 78 utilize these established connections to communicate signals (e.g., voice communications, data communications, etc.) over 5G telecom network 50. This enables any UE device 72 to establish a connection with another UE device 72 over 5G telecom network. For example, user 80 can use 5G telecom network 50 initiate a voice call or text message to human object 74 (e.g., a child of user 80) over transmission node 78 using a telephone or text application on UE device 72 to ask human object 74 where human object 74 is currently located. In addition, connections established by UE device 72 with 5G telecom network using transmission nodes 78 can allow UE device 72 connect with other resources outside 5G telecom network. The other resources can include, but are not limited to a single client computer, an internet of things (IoT) device, a UE device connected to another network, a server computer, a local area network (LAN), a wide area network (WAN), the Internet, and/or any other connected device, for example, user 80 can open a ride sharing application on UE device, which sends a request through transmission node 78 to 5G telecom network 50 to an internet-based ride sharing service. This request can include a location (e.g., a building address of user 80), allowing non-human object 76 (e.g., ride sharing automobile) to be dispatched to the location.

The inventors of the invention described herein have discovered certain deficiencies in the ability of UE devices 72 to enable user 80 to visually locate a real-world object. Presently, though location services may exist and may provide user 80 a general location of another UE device 72, the locations provided by these location services may not have acceptable accuracy for certain situations. One limitation is that there are some situations where only two-dimensional user location may be incomplete for providing an accurate location. As an example, consider a case in which user 80 has booked a cab (e.g., non-human object 76) and is waiting for the cab to arrive at user's 80 location. Using current location service solutions, the lack of specificity in these solutions will require user 80 to manually check each car present at the location and validate the number plates of the car once user 80 has been notified that the cab has arrived. This may be compounded by other factors, such as a non-responsive cab driver and or other communication issues. This task can become increasingly more difficult as the number of cars that user 80, potentially with baggage in tow, needs to check and validate increases, such as may be the common situation in crowded public places like train stations and airports. Though the location of all the cars are same, user 80 may have no way to distinguish his/her car from others.

Further, location and positioning system found in current solutions fail to contain any intelligence about the height of the individual entities from ground. For example, if user 80 were on 10th floor of a parking building (say airport parking building) and waiting for a cab, then unless user 80 indicates this fact explicitly, there is no way by which the cab driver can currently identify that user 80 is on the 10th floor. As a result, even though the cab driver may have reached the address indicated as the place for pick-up of user 80, the driver would not know to proceed to the 10th floor to pick up user 80. Further, if the driver has arrived and is waiting at a different (e.g., the 9th) floor, user 80 would have no clue to this information, as current location solutions provided by the booking app on the UE device 72 possessed by user 80 cannot not show user 80 data about elevation and/or relative elevation of with respect to the cab.

Moreover, even if the height and altitude difference is collected using smartphone devices, current ways to display these elevation information and location finding in a more meaningful way is lacking in current location service solutions. Although the location of user 80 retrieved by current location service solutions may give rudimentary information for reference purposes, there is currently no way to trace the person, device, vehicle or interested party when the destination location is extremely crowded. The current mechanism to collect the information from users 80 and provision a way to identify the exact location of both user 80 and any human object 74 or non-human object 76 that user 80 wishes to locate based on time and situation and selectively to enable the detailed location sharing in natural way is absent. As such, there is need for a solution that can minimize the manual intervention (e.g., to trace all the number plates, visually scan for a person in a crowd, and/or the like) and avoid confusion.

The present invention cures one or more of above and/or other deficiencies of the current location service solutions by providing a solution that will work in the 5G service orchestration layer and, in some embodiments, along with support from 4G and other device compatible forms. To do so, the present invention collects real-time information with enhanced accuracy about device locations and provisions an indicator on the user's 80 UE device 72 that identifies the location of the interested parties using gyroscope enabled display and symbol embedding techniques. The improved location accuracy significantly improves the ability of user 80 to locate real-world objects 74, 76 over current object location solutions. Moreover, the ability of the present invention more intuitively to indicate the location of real-world objects visually to user 80 provides enhanced savings of time and resources and reduces frustration and concern that may arise from failure to find a real-world object.

Referring again to FIGS. 2 and 3, object location service initiator 92 of system 90, as executed by computer system/server 12, is configured to initiate object location service 84 in service orchestration layer 82 of 5G telecom network 50. As part of this initiation of object location service 84, object location service initiator 92 creates a dedicated logical channel (DTCH) between 5G UE device 72 and the service orchestration layer 82 and initiates a data collection daemon running at the UE device. UE device 72 can include, but is not limited to, any of a mobile phone, a handheld computer device, a smart car display, smart glasses, a helmet smart display, and/or the like. In any case, object location service initiator 92 performs this initiation in response to a request on UE device 72 from user 80 corresponding to real-world object 74, 76, which user 80 is attempting to locate. To this extent, in an embodiment, the data collection daemon is only initiated and permitted for data transmission when instructed by the calling services in response to express user 80 authorization using any existing authentication system. For example, request from user 80 corresponding to real-world object 74, 76 may be a request on an application (app) that books cars for users 80 (e.g. cab booking system, ride sharing application, and/or the like), an app that finds a location of a person (e.g., proximity-based dating app, child location app, and/or the like), an app that controls a robotic device (self-driving automobile, IoT device, automated agricultural equipment, remote control ground-based or aerial vehicle, and/or the like), and or any other application for which location services may be useful.

Figure 4:
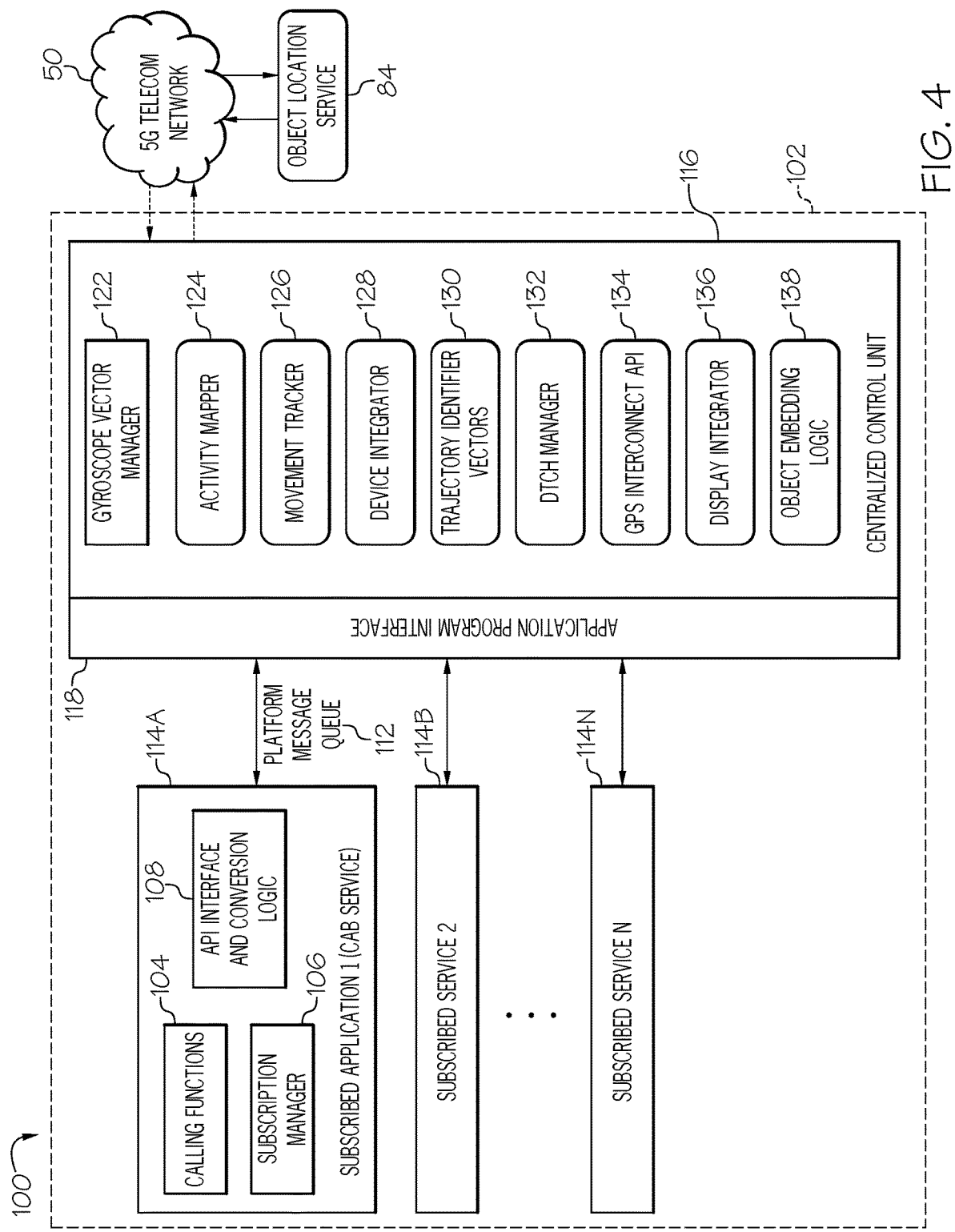
FIG. 4 shows an example environment that includes a functional block diagram of a user equipment (UE) device according to illustrative embodiments.

Referring now to FIG. 4, an example environment 100 that includes a functional block diagram 102 of a user equipment (UE) device 72 (FIG. 2) is shown according to illustrative embodiments. In an embodiment, all, or a portion of an instance of system 90 is run as an application or sub-application on UE device 72 (FIG. 2). The UE instance can be initiated at the time of device boot-up and, upon initiation, can establish a connection with the device sensors (e.g., camera, audio stream collectors, GPS modules, and/or the like). When location services are required, the instance can be called by calling functions 104 of subscribing applications 114A-N, which each have subscriptions managed by a subscription manager 106. To accomplish this, a subscribing application 114N can use API interface and conversion logic 108 to forward a request to for location services to platform message queue 112. This request can be forwarded by API 118 of centralized control unit 116 to be processed by device integrator 128. In response to the receipt of the request, DTCH manager 132 contacts 5G telecom network 50 side real-world object visual location enabler 90 services to begin the process of initiating the object location service.

Figure 5:
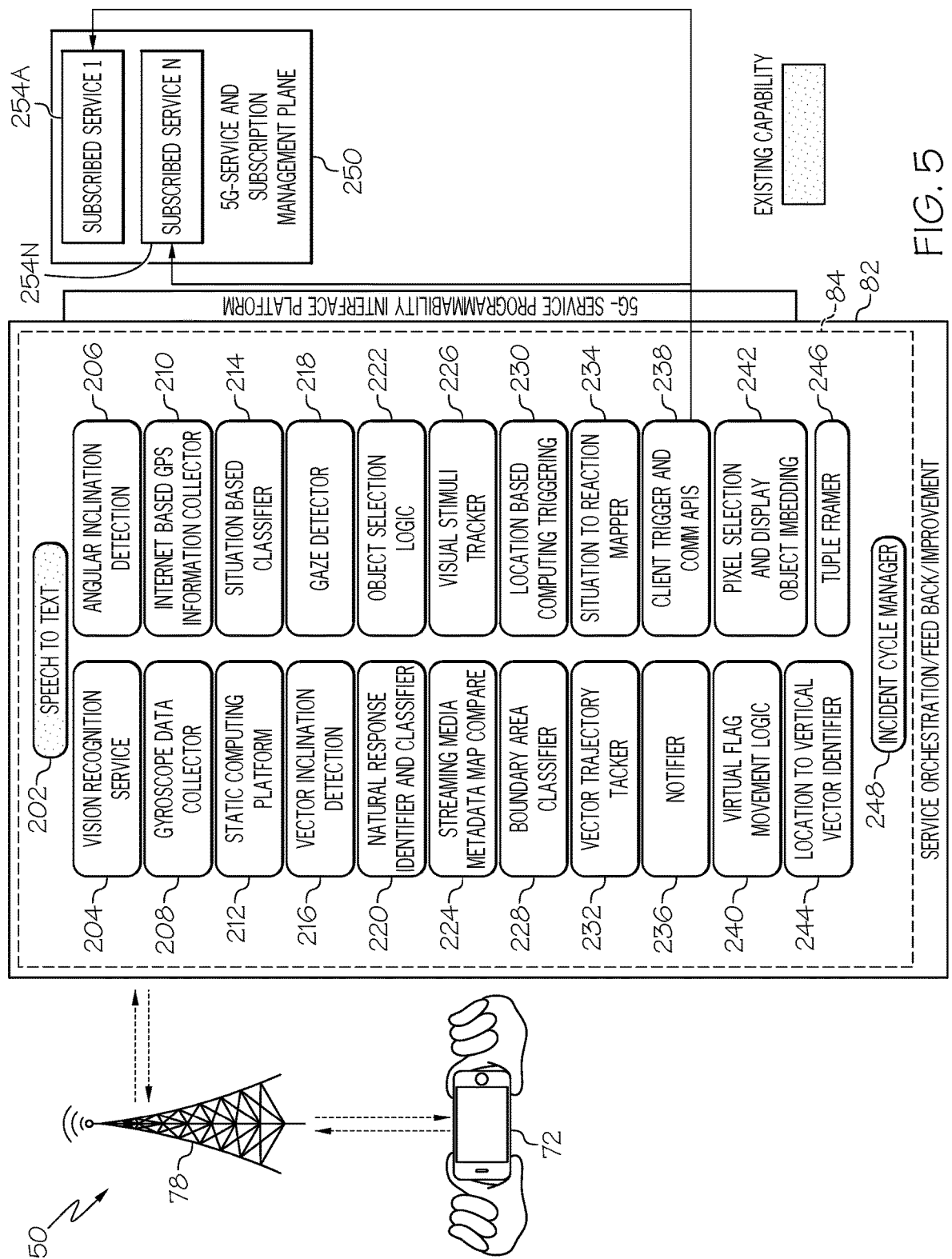
FIG. 5 shows an example of an object location service initiated in service orchestration level of 5G network environment according to illustrative embodiments.

Referring now to FIG. 5, an example object location service 84 initiated in service orchestration level 82 of 5G network environment 50 is shown according to illustrative embodiments. As shown, object location service 84 includes a number of components 202-248 that enable object location service to perform the required functions. When a request for location services is received from UE devices 72, client trigger and communication APIs 238 create an instance for each requesting subscribed service 254A-N in a 5G service and subscription management plane 250. Object location service then creates a 5G logical channel (5G. DTCH) over radio bearer over media access control (MAC) based controls in response to the user request. Referring additionally to FIG. 4, connectivity to service instances 254A-N is established by exchanging the universally unique identifier (UUID) of the UE devices 72 along with subscription details for subscribed application 114A-N with object location service 84 over the existing controller radio bearer channel via transmission nodes 78. Upon reception of the instruction from UE device 72, the service instance validates the authenticity of the UE device 72 using UUID and an international mobile subscriber identity (IMSI) number and a DTCH_CREATE request is originated to the virtualized network function (VNF). The 5G DTCH is then extended to the service orchestration layer service orchestration plane via VNF and software defined networking functions of 5G physical network function (PNF). Specifically, the VNF receives in-bound command over MAC protocol and traverses the appreciate PNF to create the logical channels. Upon negotiation of all the DTCH attributes, the channel is created over a Radio bearer and extended to the S1 bearer that reaches to the service orchestrator layer using VIM functions of Software Defined Networking of 5G VNF.

Referring now to FIGS. 2-5, three-dimensional coordinate stream collector 94 of system 90, as executed by computer system/server 12 is configured collect a plurality of streams of three-dimensional coordinates. To this extent, the three-dimensional coordinates collected by three-dimensional coordinate stream collector 94 include a first stream of three-dimensional coordinates corresponding to UE device 72 of user 80 and a second stream of three-dimensional coordinates corresponding to real-world object 74, 76. To accomplish this, once the DTCH is created and registration is accomplished, object location service 84, which was initiated by object location service initiator 92 in service orchestration layer 82, collects the device identify and tracks the location of each UE device 72. This can be done over the DTCH using data collector services situated at the edged cloud of 5G telecom network 50 with the help of in-bound or out-of-bound service infrastructure management APIs. In any case, the use of the 5G-DTCH with dedicated bandwidth and QCI allocations to collect the stream of three-dimensional coordinates from UE devices 72 provides support for real-time data processing of the data collection, as well as the subsequent calculating and application of the collected data.

To accomplish the collection of this data, each of UE devices 72 starts collecting the GPS information, existing loaded location maps and gyrometric trajectory vectors to provide to service orchestration layer 82. For example, a gyroscope vector manager 122 of UE device 72 can provide information about the rotational movement, directional orientation, etc., of UE device 72 to a gyroscopic data collector 208 of object location service 84. Similarly, a GPS interconnect API 134 of UE device 72 can provide GPS information of UE device 72 to an Internet based GPS collector 210 of object location service 84. In addition, theses and/or other components of UE device 72 can be used to convey dynamic real time altitude measurement system information of UE device 72 to object location service 84. Moreover, in cases in which subscribed application 114N invokes the camera of UE device 72, then the visual stream can be sent to a vision recognition service 204 object location service 84 along with the gyrometric vector maps. Similarly, speech collected from UE device 72 can be collected and converted using speech to text 202 and natural response identifier and classifier 220 can be invoked to get the natural language processing (NLP) response in cases in which it is invoked. One or both of these take the form of a virtual assistant system that can be integrated to offer more natural communication with user.

Whatever the case, the stream of data can be classified using situation-based classifiers 214, which can be serial or parallel stream-based, for articulation of situational insights for the vector maps. In an embodiment, the collected and classified stream of three-dimensional coordinates can be processed in real-time as it is being collected. In addition, or in the alternative, static computing platforms 212 can invoked to collect the GPS trajectory maps, device calling app functions and data structure information and extract the collected location information 86A-N to a datastore 34 for later processing.

Continuously updated 3-D vector calculator 96 of system 90, as performed by computer system/server 12, is configured to calculate a continuously updated three-dimensional vector from user 80 to the real-world object 74, 76 based on the set of user coordinates and a set of object coordinates. In particular, as object location service receives the stream of three-dimensional coordinates from each of the UE devices 72, object location service 84 continuously computes a three-dimensional location for user 80, based on the stream of three-dimensional coordinates being collected from UE device 72 corresponding to user 80 and a three-dimensional location for real-world object 74, 76, based on the stream of three-dimensional coordinates being collected from UE device 72 corresponding to real-world object 74, 76. Based on these three-dimensional locations object location service 84 calculates and continuously updates a three-dimensional vector that describes an exact distance and direction, which is not simply planar but also includes relative altitude (e.g., in an x, y, z coordinate system), of real-world object 74, 76 with respect to user 80.

To accomplish this, the stream of data from activity mapper 124 and trajectory identifier vectors 130 that is used to calculate the device vector trajectory is parsed by a vector trajectory tracker 232 of object location service 84 and saved in mapper objects. These mapper objects are supplied to a movement tracker 126 to get the decisions of the location of UE devices 72 corresponding to one or more desired real-world objects 74, 76. The vector mappers from gyroscope vector manager 122 are then classified according to their virtual elevations and altitude using vector inclination detection 216 based on the gyrometric indices received. The movement manager then locates the users based on the classified information and based on the device movement from movement tracker 126.

Real time augmented reality indicator applier 98 of system 90, as executed by computer system/server 12, is configured to apply an augmented reality indicator to real-world object 74, 76 on a display of UE device 72 of user 80. This augmented reality indicator is applied by and continuously updated by object location service 84 based on the continuously updated three-dimensional vector to provide an up to date real time indication of the location of the real-world object 74, 76. To accomplish this, virtual flag movement logic 240 can select one or more flags for embedding into the device screen as the augmented reality indicator based on the situation. To this extent, the augmented reality indicator can take the form of an arrow, a highlighted region, a brightened or darkened region, and/or any other augmentation that is now known or later discovered for distinguishing one real-world object 74, 76 from another in a video feed. Additionally, or in the alternative, the augmented reality indicator can also include one or more textual notifications. Specifically, situation to reaction mapper 234 can identify various reactions and situations that apply to the environment in which user 80 is located and/or the type of location request being submitted by user 80 based on information collected by object location service 84. This situation information can be used by situation to reaction mapper 234 to generate and to frame a natural language textual notification (e.g., word, phrase, sentence, etc.) by virtual assistant. Notifier 236 can utilize a notification generator engine that actuates screen messages, and optionally voice messages, to display and/or vocalize the generated natural language notification in conjunction with the recognized real-world object 74, 76 on the display of UE device 72 of user 80, based on configuration strategy.

In an embodiment, a direction in which user 80 is facing is determined based on the UE based gyroscopic dimensions collected by object location service 84. If real-world object 74, 76 is located within the field of view of UE device 72 of user 80, real-world object 74, 76 is identified and a directional indicator that directly identifies real-world object 74, 76 is applied directly to real-world object. However, if real-world object 74, 76 is not located within the field of view of UE device 72 of user 80, the augmented reality indicator applied by object location service 84 can take the form of a directional indicator that indicates the edge of the display screen that is nearest to the direction in which real-world object 74, 76 is located. In either case, because the object location service 84 takes into account altitude data in calculating its continuously updated three-dimensional vector, the augmented reality indicator can indicate (e.g., visually and/or numerically) that real-world object 74, 76 is located at a different altitude from user 80, allowing user to proceed more easily and quickly to the location of real-world object 74, 76 (e.g., to the correct level of a parking garage).

In an embodiment, the increased bandwidth and communication speed that can be achieved as a result of the 5G DTCH can be used by object location service 84 to embed the augmented reality indicator into the video stream of UE device 72 in real time. To accomplish this, a visual camera stream of UE device 72 can be obtained from UE device 72 along with a set of location mapping tuples that form the stream of three-dimensional coordinates. Based on the three-dimensional vector calculated based on the set of location mapping tuples, the location of the image of real-world object 74, 76 can be identified in the visual camera stream by object location service 84. Object location service 84 perform the augmentation of the video by inserting the augmented reality indicator into the visual camera stream at the location which it identified. The result is that the image of the real-world object is distinguished from other objects in the in the visual camera stream by the augmented reality indicator. The augmented version of the visual camera stream, which is augmented with the inserted augmented reality indicator, is then returned from the object location service 84 to the UE device 72 of user 80 over the 5G DTCH connection for display to user 80. As a result, the augmented video tracks the real-time feed from the UE device 72 camera because of the speed of the communications over the 5G DTCH connection.

In an embodiment, once the movement manager locates the users, the augmented reality indicator objects are selected for embedding using object selecting logic 222. Boundary area classifier 228 can be used to delineate a boundary area, which can be defined as the region within the visual display in which the search for real-world object 74, 76 will occur and the range at which real-world object will be polled. This boundary area can vary based on the computational power of the device as a broader region needs would require a greater number of polling cycles per unit time. Location based computing triggering 230 works with boundary definition and polls for the activates once the devices are in the definition region, allowing streaming media metadata map compare 224 to trigger tag and VA communication once the devices are detected nearer to each other.

Once this occurs, a determination is made by angular inclination detection 206 and location to vertical vector identifier 244 of object location service 84 as to whether UE device's 72 camera projection is in the vertical vector span (e.g., pointing in the direction) of real-world object 76. Vision recognition service 204, which is a service responsible for vision detection, can also collect the information about the location of the camera device and determine the vision direction of the device (e.g., the line of sight of the camera). If the determination is positive, object location service 84 analyzes the received video stream. Inline object recognition is used to identify stream objects (e.g., vehicle type, UE identity, facial recognition, and/or the like) and the flagging symbols are pushed to the DTCH VNFs. The target flagging symbols can be static or coupled with cognition enabled systems for more robust identification. For example, gaze detector 218: Gaze detection can be used to locate the position on a monitor screen where a user is looking. Based on this, visual stimuli tracker 226 can track where the user is looking and accordingly manage the object and tag embedding. In any case, the screen pixel location for the identified objects on UE device 72 are determined by pixel selection and display object embedding 242 of object location service 84 based on the motion vectors and trajectory paths of the gyrometric indices. Object embedding logic 138 can then be used to embed the augmented reality indicator into the video display and the augmented video display can be presented to user 80 by display integrator 136.

Once real-world object 74, 76 has been identified, tuple framer 246 of object location service 84 can continuously generate the tuple <Symbol object, pixel locations> as the input vectors change (user 80 is moving the UE device 72, car real-world object 76 is in motion, etc.). This tuple is pushed using downlink VNF calls using DTCH mapper of UE-UUID and DTCH mapping tables at 5G-VNF. In any case, once the tuple reaches UE device 72, the embedding objects can be extracted and pushed to the device screen for display to the user. Incident cycle manager 248 can store and analyze object tracking and/or augmented reality indicator placement history (e.g., using machine learning) for continuous improvement.

Figure 6:
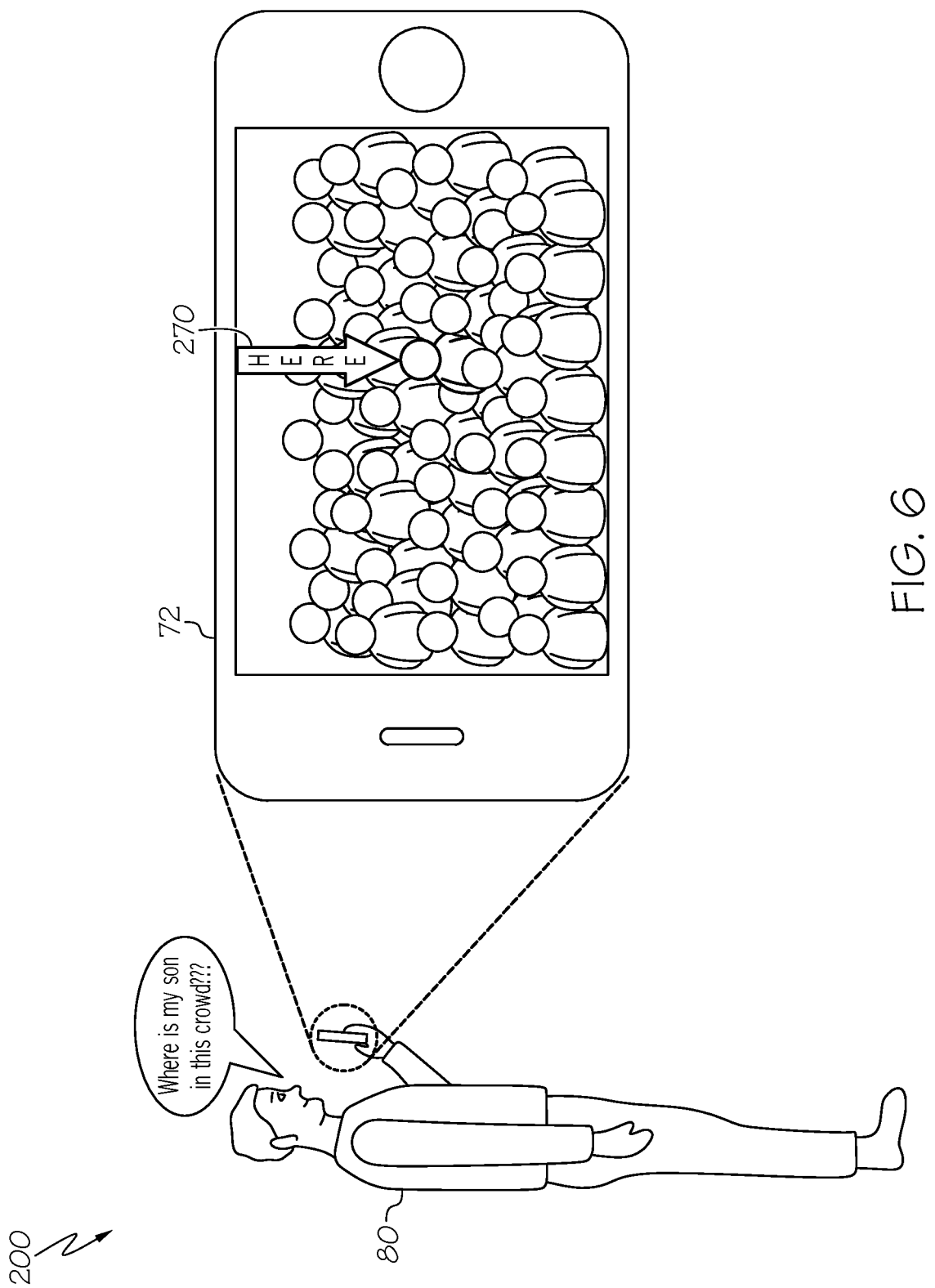
FIG. 6 shows an example applying of an augmented reality indicator according to illustrative embodiments.

Referring now to FIG. 6, example applying of an augmented reality indicator 270 is shown according to an embodiment of the present invention. As shown, user 80 is attempting to locate his/her son in a large crowd of people. Using a voice command, user 80 asks "Where is my son in this crowd???" In response, object location service 84 has located user's 80 son by locating his phone, which mom/dad's phone has been authorized to find and, in response to user's 80 authorization, has inserted augmented reality indicator 210 into the video display of user's 80 UE device 72.

Figure 7:
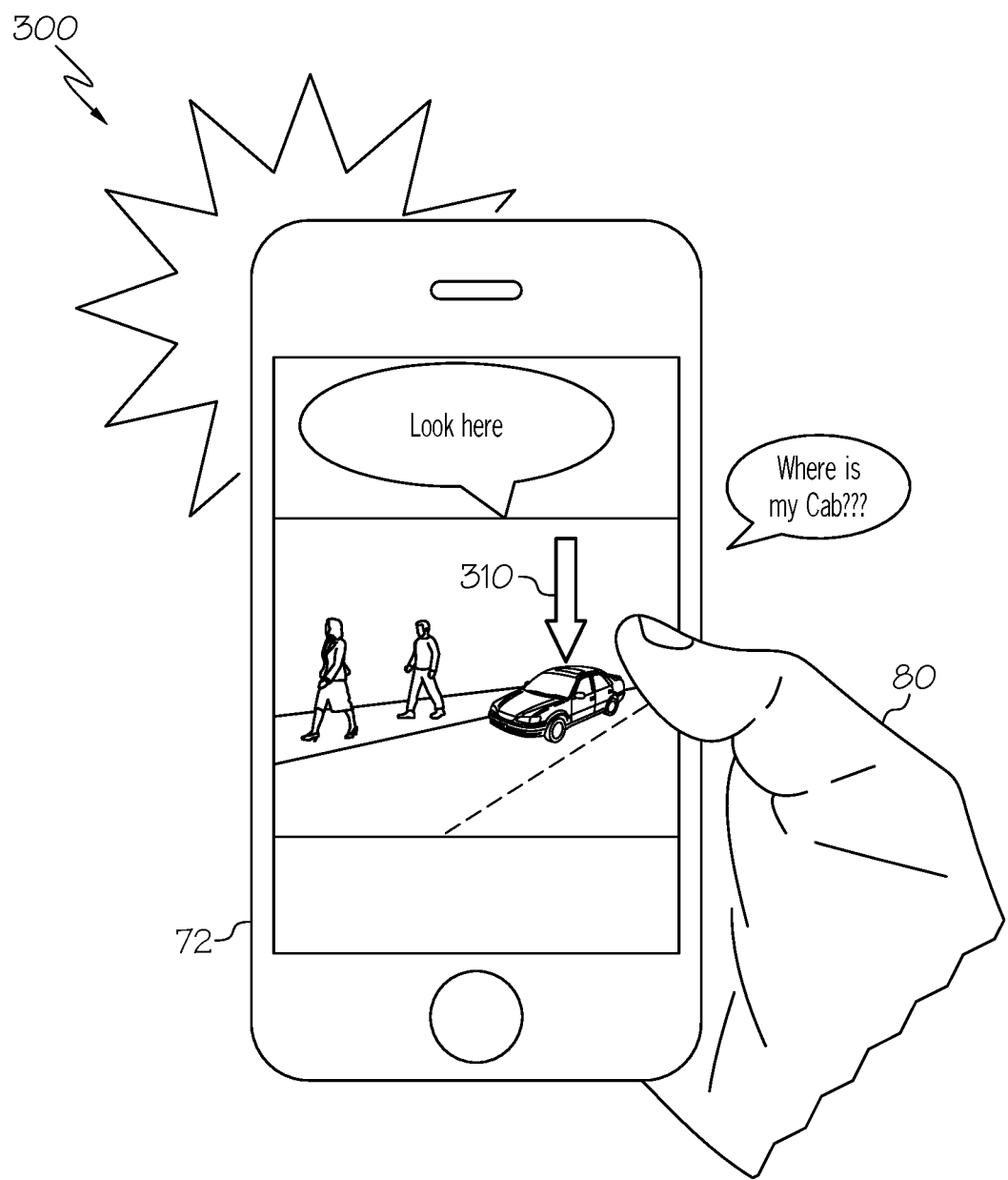
FIG. 7 shows an example applying of an augmented reality indication on a UE device display according to illustrative embodiments.

Referring now to FIG. 7, example applying of an augmented reality indicator 310 is shown according to an embodiment of the present invention. As shown, user 80 is attempting to locate his/her cab on a crowded street. In response to the request for the cab, object location service 84 has located user's 80 cab, for which cab driver has given permission for his UE to be recognizable to his passenger, and has inserted augmented reality indicator 310 along with the words "Look here" into the video display of user's 80 UE device 72.

Figure 8:
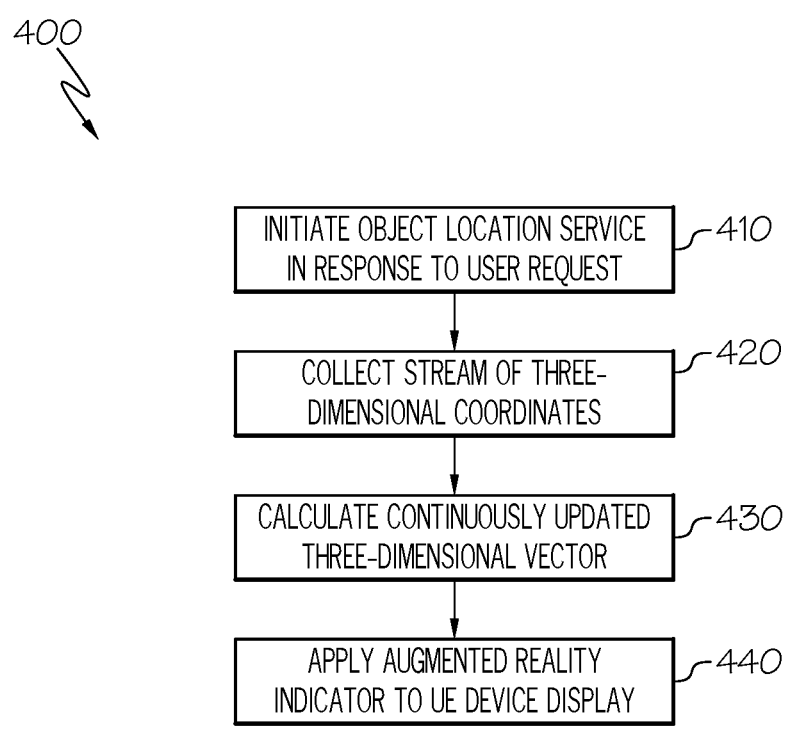
FIG. 8 shows a process flow diagram according to illustrative embodiments.

Referring now to FIG. 8 in conjunction with FIGS. 2-5, a method flow diagram 400 according to an embodiment of the present invention is shown. At 410, 5G object location service initiator 92 of system 90, as executed by computer system/server 12, initiates object location service 84 in service orchestration layer 82 of 5G telecom network 50 in response to a request from user 80 corresponding to real-world object 74, 76. At 420, three-dimensional coordinate stream collector 94 collects a stream of three-dimensional coordinates corresponding to each of UE device 72 of user 80 and UE device 72 corresponding to real-world object 74, 76. At 430, continuously updated 3-D vector calculator 96 calculates a continuously updated three-dimensional vector from user 80 to real-world object 74, 76 based on the set of user coordinates and a set of object coordinates. At 440, real time augmented reality indicator applier 98 applies an augmented reality indicator to real-world object 74, 76 that is continuously updated in real-time on the display of UE device 72 corresponding to user 80 based on the continuously updated three-dimensional vector.

Process flowchart 300 of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for enabling visual location of a real-world object. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for enabling visual location of a real-world object. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for enabling visual location of a real-world object. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method, comprising:
   initiating, in response to a request from a user corresponding to the real-world object, an object location service in a service orchestration layer of a 5G telecom network;
   creating, by the object location service in response to the user request, a 5G logical channel (5G, DTCH) over radio bearer over MAC based controls;
   extending the 5G DTCH to the service orchestration layer service orchestration plane via Virtual Network Functions (VNFs) and Software Defined Networking functions of a 5G physical network function (5G-PNF);
   collecting, by the object location service, a stream of three-dimensional coordinates corresponding to each of a user equipment (UE) device of the user and a UE device corresponding to the real-world object;
   calculating, by the object location service, a continuously updated three-dimensional vector from the user to the real-world object based on the set of user coordinates and a set of object coordinates; and
   applying, by the object location service, an augmented reality indicator to the real-world object that is continuously updated in real-time on a display of the UE device corresponding to the user based on the continuously updated three-dimensional vector,
   wherein the collecting of the stream of three-dimensional coordinates from the UE devices uses the 5G-DTCH with dedicated bandwidth and QCI allocations to support real-time data processing of the collecting, the calculating, and the applying.

2. The method of claim 1, wherein the three-dimensional coordinates include global positioning system (GPS) coordinate information, dynamic real time altitude measurement system information, and UE based gyroscopic dimensions.

3. The method of claim 2, further comprising:
   determining a direction in which the user is facing based on the UE based gyroscopic dimensions,
   wherein the augmented reality indicator is a directional indicator that points to a edge of a display screen nearest to the real-world object in response to a determination that the user is not facing the real-world object resulting in the object being outside a field of view of the UE device.

4. The method of claim 1, further comprising obtaining, from the UE device of the user, a visual camera stream of the UE device along with a set of location mapping tuples that form the stream of three-dimensional coordinates;
   identifying a location of an image of the real-world object in the visual camera stream of the UE device based on the three-dimensional vector calculated based on the set of location mapping tuples;
   augmenting the visual camera stream by inserting the augmented reality indicator at the location identified in the visual camera stream, such that the augmented reality indicator distinguishes the image of the real-world object in the visual camera stream; and
   returning an augmented version of the visual camera stream with the augmented reality indicator inserted therein to the UE device of the user for display to the user.

5. The method of claim 4, further comprising updating the location of the augmented reality indicator in the augmented version of the visual camera stream in real time in response to a change in real-world location of at least one of the user and the real-world object.

6. The method of claim 1, wherein the augmented reality indicator includes an altitude of the real-world object.

7. A computer system, comprising:
   a memory medium comprising program instructions;
   a bus coupled to the memory medium; and
   a processor for executing the program instructions, the instructions causing the system to:
   initiate, in response to a request from a user corresponding to the real-world object, an object location service in a service orchestration layer of a 5G telecom network;
   create, by the object location service in response to the user request, a 5G logical channel (5G, DTCH) over radio bearer over MAC based controls;
   extend the 5G DTCH to the service orchestration layer service orchestration plane via Virtual Network Functions (VNFs) and Software Defined Networking functions of a 5G physical network function (5G-PNF);

collect, by the object location service, a stream of three-dimensional coordinates corresponding to each of a user equipment (UE) device of the user and a UE device corresponding to the real-world object;

calculate, by the object location service, a continuously updated three-dimensional vector from the user to the real-world object based on the set of user coordinates and a set of object coordinates; and apply, by the object location service, an augmented reality indicator to the real-world object that is continuously updated in real-time on a display of the UE device corresponding to the user based on the continuously updated three-dimensional vector, wherein the instructions causing the system to collect the stream of three-dimensional coordinates from the UE devices uses the 5G-DTCH with dedicated bandwidth and QCI allocations to support real-time data processing of the collecting, the calculating, and the applying.

8. The computer system of claim 7, wherein the three-dimensional coordinates include global positioning system (GPS) coordinate information, dynamic real time altitude measurement system information, and UE based gyroscopic dimensions.

9. The computer system of claim 8, the instructions further causing the system to:
determine a direction in which the user is facing based on the UE based gyroscopic dimensions,
wherein the augmented reality indicator is a directional indicator that points to a edge of a display screen nearest to the real-world object in response to a determination that the user is not facing the real-world object resulting in the object being outside a field of view of the UE device.

10. The computer system of claim 7, the instructions further causing the system to:
obtain, from the UE device of the user, a visual camera stream of the UE device along with a set of location mapping tuples that form the stream of three-dimensional coordinates;
identify a location of an image of the real-world object in the visual camera stream of the UE device based on the three-dimensional vector calculated based on the set of location mapping tuples;
augment the visual camera stream by inserting the augmented reality indicator at the location identified in the visual camera stream, such that the augmented reality indicator distinguishes the image of the real-world object in the visual camera stream; and
return an augmented version of the visual camera stream with the augmented reality indicator inserted therein to the UE device of the user for display to the user.

11. The computer system of claim 10, the instructions further causing the system to update the location of the augmented reality indicator in the augmented version of the visual camera stream in real time in response to a change in real-world location of at least one of the user and the real-world object.

12. The computer system of claim 7, wherein the augmented reality indicator includes an altitude of the real-world object.

13. A computer program product, comprising a computer readable storage device, and program instructions stored on the computer readable storage device, to:
initiate, in response to a request from a user corresponding to the real-world object, an object location service in a service orchestration layer of a 5G telecom network;

create, by the object location service in response to the user request, a 5G logical channel (5G, DTCH) over radio bearer over MAC based controls;

extend the 5G DTCH to the service orchestration layer service orchestration plane via Virtual Network Functions (VNFs) and Software Defined Networking functions of a 5G physical network function (5G-PNF);

collect, by the object location service, a stream of three-dimensional coordinates corresponding to each of a user equipment (UE) device of the user and a UE device corresponding to the real-world object;

calculate, by the object location service, a continuously updated three-dimensional vector from the user to the real-world object based on the set of user coordinates and a set of object coordinates; and apply, by the object location service, an augmented reality indicator to the real-world object that is continuously updated in real-time on a display of the UE device corresponding to the user based on the continuously updated three-dimensional vector, wherein the instructions causing the system to collect the stream of three-dimensional coordinates from the UE devices uses the 5G-DTCH with dedicated bandwidth and QCI allocations to support real-time data processing of the collecting, the calculating, and the applying.

14. The computer program product of claim 13,
wherein the three-dimensional coordinates include global positioning system (GPS) coordinate information, dynamic real time altitude measurement system information, and UE based gyroscopic dimensions, and
wherein the augmented reality indicator includes an altitude of the real-world object.

15. The computer program product of claim 14, the program instructions further to:
determine a direction in which the user is facing based on the UE based gyroscopic dimensions,
wherein the augmented reality indicator is a directional indicator that points to a edge of a display screen nearest to the real-world object in response to a determination that the user is not facing the real-world object resulting in the object being outside a field of view of the UE device.

16. The computer program product of claim 13, the program instructions further to:
obtain, from the UE device of the user, a visual camera stream of the UE device along with a set of location mapping tuples that form the stream of three-dimensional coordinates;
identify a location of an image of the real-world object in the visual camera stream of the UE device based on the three-dimensional vector calculated based on the set of location mapping tuples;
augment the visual camera stream by inserting the augmented reality indicator at the location identified in the visual camera stream, such that the augmented reality indicator distinguishes the image of the real-world object in the visual camera stream; and
return an augmented version of the visual camera stream with the augmented reality indicator inserted therein to the UE device of the user for display to the user.

17. The computer program product of claim 16, the program instructions further to update the location of the augmented reality indicator in the augmented version of the visual camera stream in real time in response to a change in real-world location of at least one of the user and the real-world object.

* * * * *